United States Patent
Woodworth et al.

(10) Patent No.: US 10,351,236 B1
(45) Date of Patent: Jul. 16, 2019

(54) WEIGHT REDUCTION IN UNMANNED AERIAL VEHICLES

(71) Applicant: Wing Aviation LLC, Mountain View, CA (US)

(72) Inventors: Adam Woodworth, Santa Clara, CA (US); Clark Sopper, Redwood City, CA (US)

(73) Assignee: Wing Aviation LLC, Mountain View, CA (US)

(*) Notice: Subject to any disclaimer, the term of this patent is extended or adjusted under 35 U.S.C. 154(b) by 239 days.

(21) Appl. No.: 15/091,646

(22) Filed: Apr. 6, 2016

Related U.S. Application Data

(60) Provisional application No. 62/143,295, filed on Apr. 6, 2015.

(51) Int. Cl.
| | |
|---|---|
| *B64C 39/02* | (2006.01) |
| *B64C 27/08* | (2006.01) |
| *B64C 27/52* | (2006.01) |
| *G05D 1/00* | (2006.01) |
| *B64C 1/06* | (2006.01) |
| *B64C 1/08* | (2006.01) |

(52) U.S. Cl.
CPC ............ *B64C 39/024* (2013.01); *B64C 1/061* (2013.01); *B64C 1/08* (2013.01); *B64C 27/08* (2013.01); *B64C 27/52* (2013.01); *G05D 1/0011* (2013.01); *B64C 2201/146* (2013.01)

(58) Field of Classification Search
CPC ......... B64C 39/024; B64C 1/061; B64C 1/08; B64C 27/08; B64C 27/52; G05D 1/0011
See application file for complete search history.

(56) References Cited

U.S. PATENT DOCUMENTS

| | | | |
|---|---|---|---|
| 4,203,250 A | 5/1980 | Garofalo | |
| 7,811,150 B2 | 10/2010 | Amireh et al. | |
| 8,827,206 B2 | 9/2014 | Van Speybroeck et al. | |
| 8,973,861 B2 * | 3/2015 | Zhou | A63H 27/12 244/17.23 |
| 2012/0056041 A1 * | 3/2012 | Rhee | B64C 25/32 244/4 R |
| 2012/0286102 A1 | 11/2012 | Sinha et al. | |
| 2014/0099853 A1 * | 4/2014 | Condon | G05D 1/0033 446/37 |
| 2014/0231582 A1 * | 8/2014 | Headrick | B64C 27/08 244/54 |

(Continued)

OTHER PUBLICATIONS

"A more Sturdy/Durable FT H Quad", Flite Test, 2014.*

(Continued)

*Primary Examiner* — Assres H Woldemaryam
(74) *Attorney, Agent, or Firm* — McDonnell Boehnen Hulbert & Berghoff LLP

(57) ABSTRACT

A remotely navigated aerial vehicle may include a main body and a propulsion system operably coupled to the main body to propel the vehicle in response to an external command. The main body may include a frame and a cover plate coupled to the frame such that the frame and cover plate define an interior cavity in at least a portion of the main body. The frame may include a central body defining a longitudinal axis of the frame, a first arm at a first end portion of the central body, and a second arm at a second end portion of the central body.

13 Claims, 14 Drawing Sheets

(56) References Cited

U.S. PATENT DOCUMENTS

2016/0101850 A1* 4/2016 Lin ..................... B64C 39/024
                                                            244/17.23
2017/0183074 A1* 6/2017 Hutson ................. B64C 1/061
2017/0327218 A1* 11/2017 Morin .................... B64C 3/385

OTHER PUBLICATIONS

"Make a Quadcopter using KK 2.1.5 Flight Controller".*
"Quadcopters are Fun: Build a Quadcopter", 2014.*
"Wayback Machine for Quadcopters are Fun Build a Quadcopter Document".*

* cited by examiner

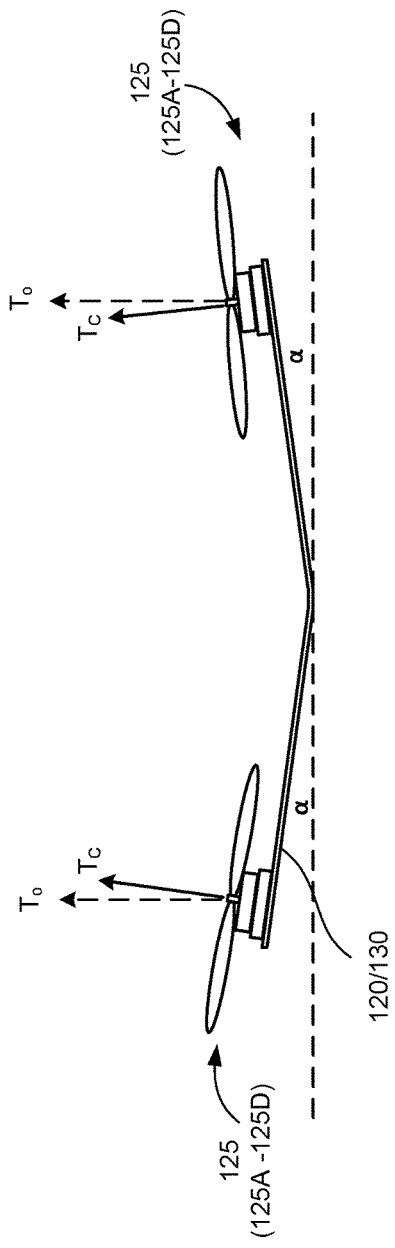
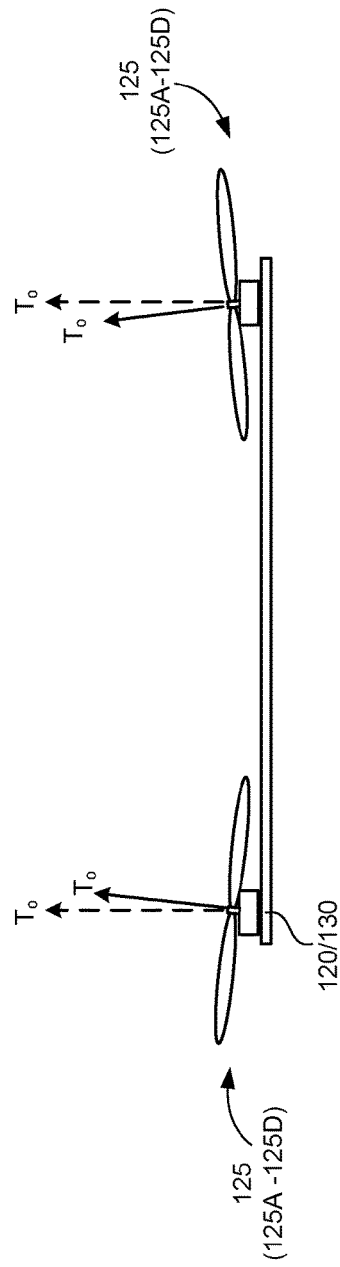

WEIGHT REDUCTION IN UNMANNED AERIAL VEHICLES

CROSS REFERENCE TO RELATED APPLICATION(S)

This application claims priority to provisional Application Ser. No. 62/143,295, filed on Apr. 6, 2015, the entirety of which is incorporated by reference as if fully set forth herein.

FIELD

This document relates, generally, to unmanned aerial vehicles, and in particular, to features of unmanned aerial vehicles that affect weight.

BACKGROUND

An unmanned aerial vehicle (UAV) is an aircraft that is flown with no pilot on board. Rather, a UAV may be remotely piloted and/or controlled by, for example, a user at a control station, or may fly autonomously based on a pre-programmed flight plan. UAVs may be, for example, fixed wing aircraft or rotary wing aircraft, and may be propelled by, for example, thrust generated by electric driven systems or gas driven systems, depending on, for example, a size and implementation environment for a particular UAV. Regardless of the mode of propulsion employed by a particular UAV, an amount of fuel carried by the UAV (either in the form of, for example, electrical power stored in battery or gas carried in a tank), the range and flight time of the UAV may be affected by overall weight of the UAV.

SUMMARY

In one aspect, an aerial vehicle may include a main body, including a frame, the frame including a central body defining a longitudinal axis of the frame, a first arm at a first end portion of the central body, and a second arm at a second end portion of the central body. The aerial vehicle may also include a cover plate coupled to the frame such that the frame and cover plate define an interior cavity in at least a portion of the main body, a propulsion system operably coupled to the main body, and a controller configured to control the propulsion system to propel the main body in response to an external command In another aspect, aerial vehicle may include a main body, the main body including a first frame member, and a second frame member coupled to an open top end portion of the first frame member, the first frame member and the second frame member in the coupled state defining an interior cavity in the main body. The aerial vehicle may also include a plurality of reinforcing ribs arranged in the interior cavity, a rotor coupled to the frame, and a controller configured to control operation of the rotor to propel the frame in response to an external command.

The details of one or more implementations are set forth in the accompanying drawings and the description below. Other features will be apparent from the description and drawings, and from the claims.

BRIEF DESCRIPTION OF THE DRAWINGS

FIGS. 2B and 2C are partial front views, of an example implementation of a multi-rotor UAV, in accordance with implementations described herein.

DETAILED DESCRIPTION

Figure 1A:
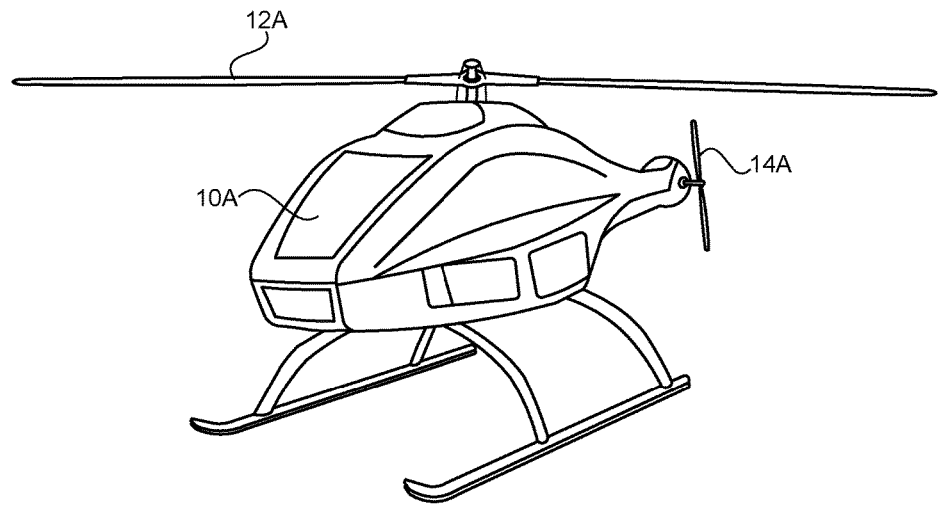
FIGS. 1A-1C are perspective views of example implementations of UAVs.
Figure 1B:
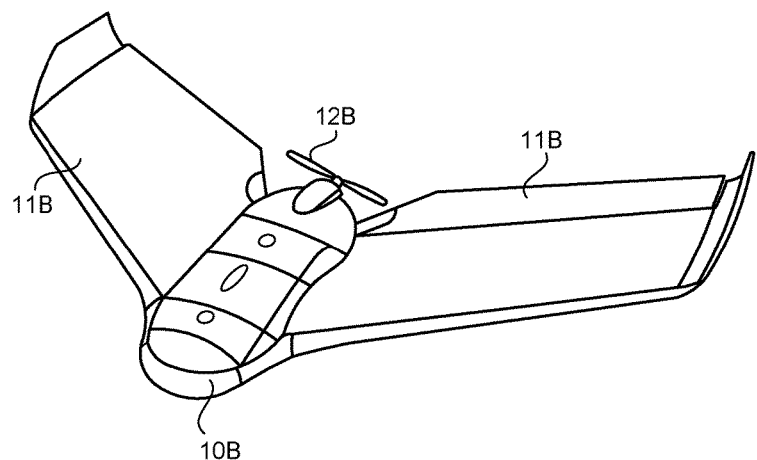
Figure 1C:
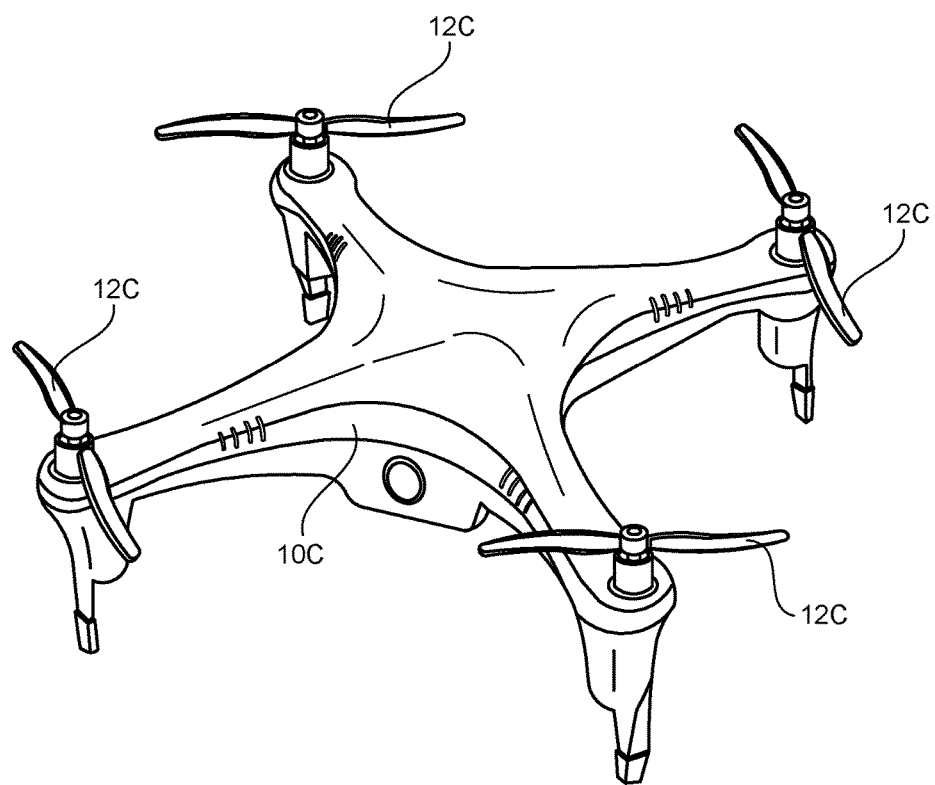

Examples of UAVs, in accordance with various example implementations, are shown in FIGS. 1A-1C. FIG. 1A illustrates a UAV implemented on a helicopter type platform, including a main body 10A propelled by a main rotor 12A and a tail rotor 14A. FIG. 1B illustrates a UAV implemented on a fixed wing type platform, including port and starboard fixed wings 11B extending from a main body 10B and propelled by a tail rotor 12B. FIG. 1C illustrates a UAV implemented on a multicopter type platform in which rotation of multiple rotors at a fixed pitch is varied to propel the UAV. The example shown in FIG. 1C is a quadcopter including four rotors 12C coupled to a main body 10C to propel the UAV. In each of the example implementations shown in FIGS. 1A-1C, a weight of the main body and components received in the main body and/or coupled to the main body may affect, for example, a range and a flight time of the UAV, which may have a fixed fuel storage capacity (for example, in the form of a battery storing electrical power to be supplied to the rotors), maneuverability of the UAV, and other operational capabilities of the UAV.

Figure 2A:
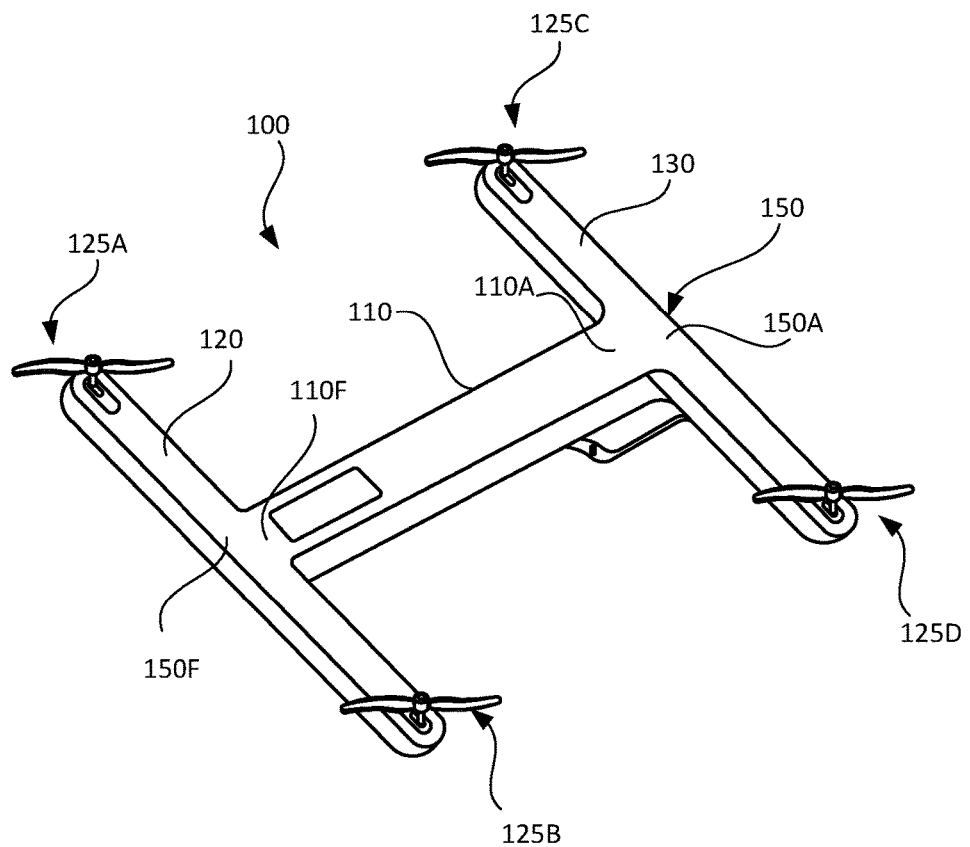
FIGS. 2A and 3 are perspective views.

FIG. 2A is a perspective view of an example UAV, in accordance implementations described herein. The example UAV shown in FIG. 2A is a quadcopter having four rotors, simply for ease of discussion and illustration. The principles to be described hereinafter may apply to various other UAV implementation platforms having different main body configuration(s) and/or different numbers and/or arrangements of rotors.

The quadcopter 100 shown in FIG. 2A may include, for example, a main body 150 including a central body 110, a first arm 120, at a first, or forward, end portion 110F of the central body 110 corresponding to a first, or forward, end portion 150F of the main body 150, and a second arm 130, at a second, or aft, end portion 110A of the central body 110 corresponding to a second, or aft, end portion 150A of the main body 150. A propulsion system, including, for example, a plurality of rotors/propellers 125A, 125B, 125C and 125D may be respectively coupled to the first and second arms 120 and 130 to provide propulsive force for movement of the quadcopter 100. In particular, in the implementation shown in FIG. 2, a first rotor 125A and a second rotor 125B may be coupled to the main body 150 at opposite end portions of the first arm 120, and a third rotor 125C and a fourth rotor 125D may be coupled to the main body 150 at opposite end portions of the second arm 130.

In the quadcopter 100 shown in FIG. 2A, the first arm 120 extends outward from the forward end of the central body 110, in a perpendicular (e.g., substantially perpendicular) orientation with respect to the central body 110, and the second arm 130 extends outward from the aft end of the central body 110, in a somewhat perpendicular orientation with respect to the central body 110. Thus, in some implementations, the central body 110 and the first and second arms 120 defining the main body 150 of the quadcopter 100 may be arranged in an 'H' shape. For example, in some implementations, the first arm 120 may be joined to the first end portion of the central body 110 at a central portion of the first arm 120, and the second arm 130 may be joined to the second end portion of the central body 110 at a central portion of the second arm 130. This 'H' shape may provide for a certain amount of structural rigidity and integrity to the quadcopter 100 while employing relatively light weight and/or low density materials, thus reducing overall weight of the quadcopter 100 while still having the structural integrity to support various components in the main body 150 of the quadcopter 100 and/or coupled to the quadcopter 100. In the quadcopter 100 shown in FIG. 2A, the first arm 120 and/or the second arm 130 may extend outward from the ends of the central body 110 in a non-perpendicular fashion.

In some implementations, the rotors 125A-125D may be slightly canted as shown in FIGS. 2B and 2C, to improve yaw control at lower rotor RPMs. This canting of the rotors 125A-125D may be achieved by, for example, a slight angling or bowing of the first arm 120 and the second arm 130, as shown in FIG. 2B, or by a canted mounting of the rotors 125A-125D on the first arm 120 and the second arm 130, as shown in FIG. 2C. This canting of the rotors 125A-125D may rotate the thrust vector generated by each of the rotors 125A-125D from a straight up thrust vector $T_O$ (for example, the thrust vector $T_O$ that would be generated if the rotors 125A-125D were oriented substantially orthogonal to the horizontal plane, or to the plane of the central body 110), to a thrust vector $T_C$ that is oriented slightly canted. In this arrangement, when diagonally opposed rotors (for example rotor 125A and rotor 125D; or rotor 125B and rotor 125C) are operated in response to a yaw command, this tilted or canted (outboard) thrust vector $T_C$ generates a direct yaw moment (from thrust) in addition to the yaw moment generated from rotor torque. This may allow for control at rotor speeds down to approximately 1500 RPM. In some implementations, rotor tilt angles α between approximately 5 and 10 degrees (with respect to a horizontal plane) may provide a level of yaw control in the quadcopter 100, without significant power increases for hover.

Figure 3:
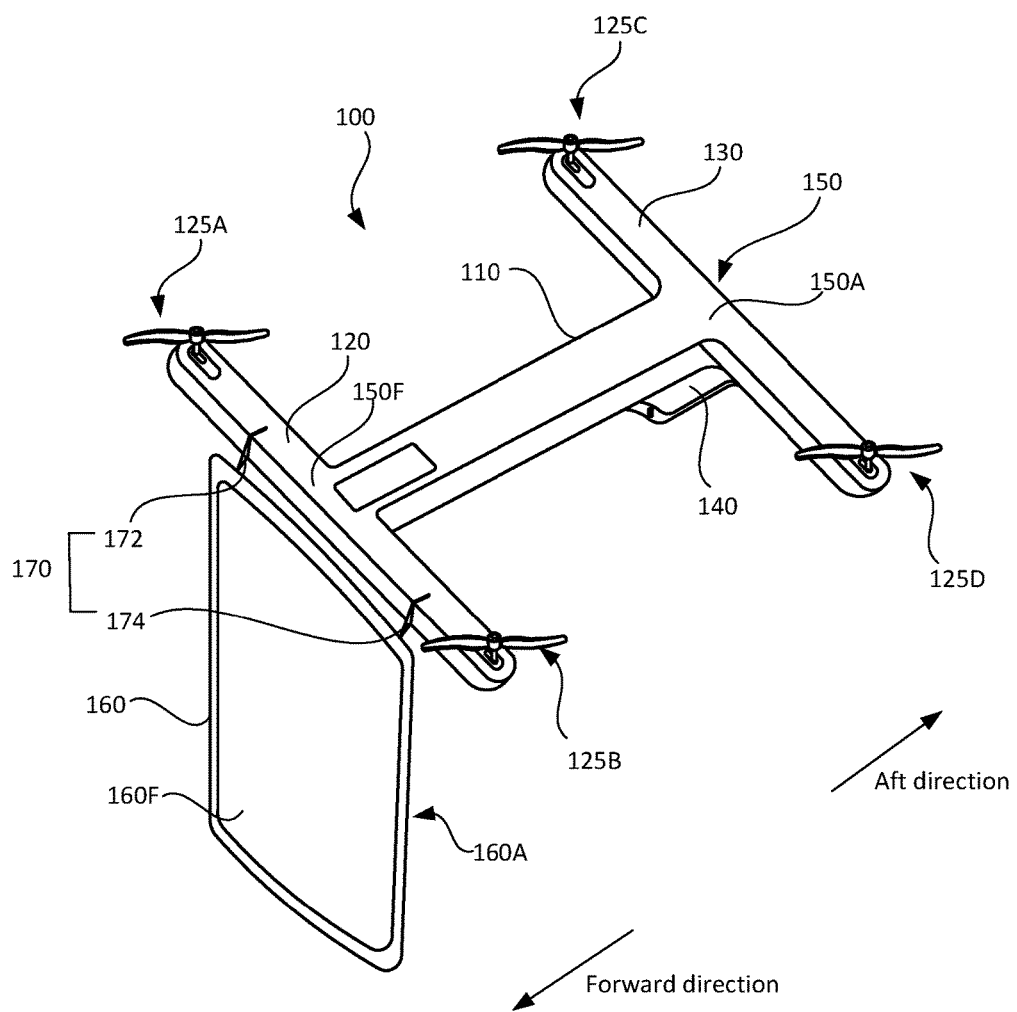

Lower disk loading may also correlate to a lower downwash velocity produced by the rotors 125A-125D. This is important when operating in an office environment, as large downwash velocities may disturb typical items encountered in an office environment, such as documents on desks/tables, plants, and the like. For example, at a hover height of greater than or equal to approximately 1 m, the downwash produced by an aerial vehicle (such as the quadcopter 100 shown in FIGS. 2 and 3) with a disk loading less than or equal to approximately 1.1 kg/m² may not cause movement a loose sheet of 8.5×11" paper on a flat smooth surface As shown in FIG. 3, in some embodiments, a screen 160 may be coupled to the quadcopter 100, and an image output device 140 may also be coupled to, or integrated into, the quadcopter 100. This arrangement will be described in more detail later.

Figure 4A:
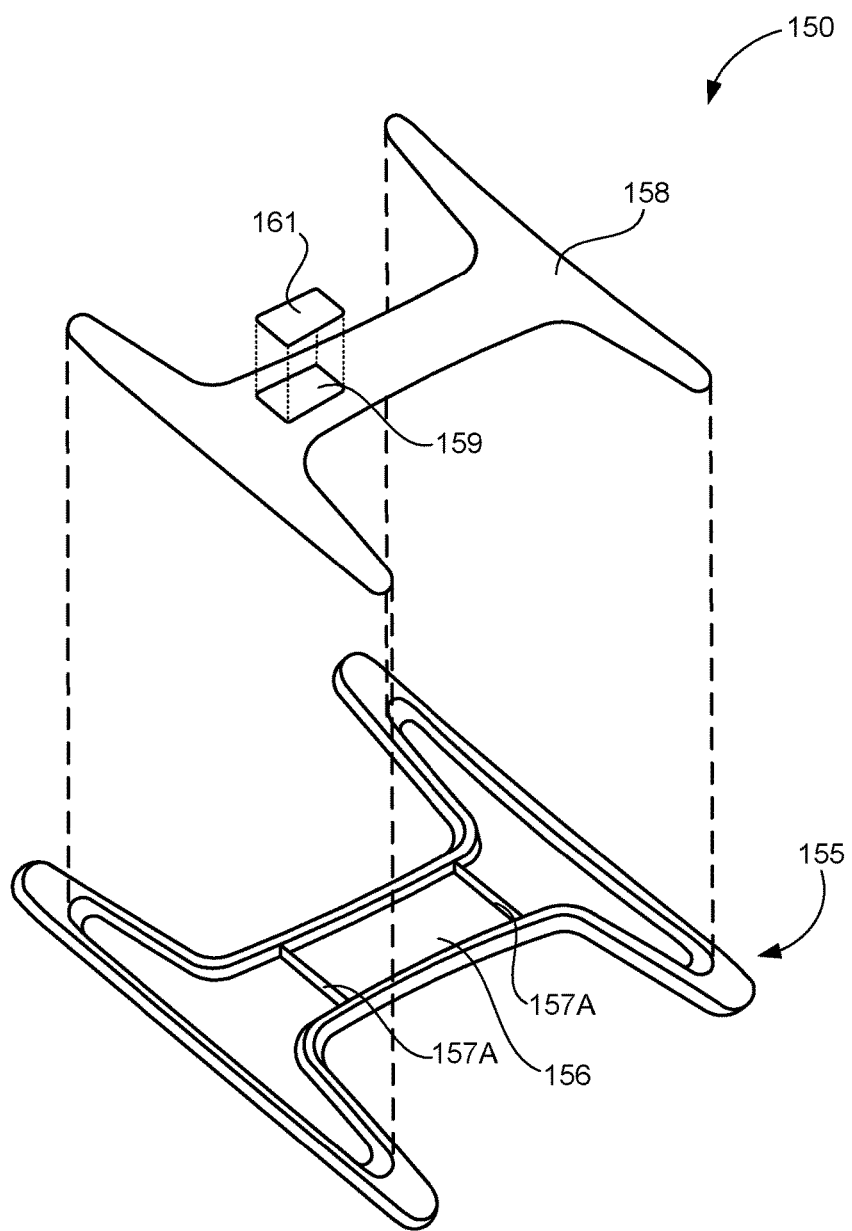
FIG. 4A is an exploded perspective view of a main body of the example UAV shown in FIGS. 2A and 3, in accordance with implementations described herein.

FIG. 4A is an exploded perspective view of the main body 150 of the example quadcopter 100 shown in FIGS. 2A and 3. In some implementations, the main body 150 may include a frame 155 and a cover plate 158. The frame 155 may define a hollow interior cavity 156 (e.g., interior cavity) of the main body 150. This hollow interior cavity 156 may house various components (to be discussed in more detail below) of the quadcopter 100, and the material eliminated from the frame 155 to yield the hollow interior cavity 156 may reduce weight of the main body 150, and thus may reduce overall weight of the quadcopter 100.

The cover plate 158 may be coupled to an open top portion of the frame 155 to enclose the hollow interior cavity 156. In some implementations, the frame 155 and the cover plate 158 may be made of different materials. For example, in some implementations, the frame 155 may be made of a first foam material, and the cover plate 158 may be made of a second foam material. In some implementations, the first foam material and the second foam material may have different densities, to reduce weight of the main body 150 as much as possible while still maintaining a sufficient degree of structural integrity and rigidity.

For example, in some implementations, the density of the second foam material (of the cover plate 158) may be greater than the density of the first foam material (of the frame 155). In this example arrangement, a weight of the frame 155, made of the less dense, first foam material and having the hollow interior cavity 156 (e.g., substantially hollow interior cavity), may be reduced as much as possible, while the cover plate 158, made of the more dense, second foam material, may provide structural rigidity and integrity to the main body 150 when the cover plate 158 is coupled to the frame 155. In some implementations, the frame 155 may be made of a foam material and include the hollow interior cavity 156, so that the weight of the frame 155 may be reduced as much as possible, and the cover plate 158 may be made of a more rigid material, such as, for example, a plastic material or a metal material, to provide a greater amount of structural rigidity and integrity to the main body 150 when the cover plate 158 is coupled to the frame 155 than when the cover plate 158 is made of a foam material.

In some implementations, the frame 155 may be made of a more dense and/or a more rigid material than the material of the cover plate 158, to provide a greater degree of structural integrity and rigidity to the main body 150, and in particular, to the frame 155. A more rigid frame 155 may provide additional structural integrity when, for example, carrying additional weight in the main body 150 due to, for example, additional components received in the cavity 156 and/or coupled to the main body 150, lifting a load for transport using the quadcopter 100 and the like. In some implementations, the frame 155 and the cover plate 158 may be made of the same material. Numerous combinations of materials, densities and/or weights and/or levels of rigidity may be applied for the frame 155 and the cover plate 158, depending on the weight and structural integrity requirements of a particular implementation.

Figure 4B:
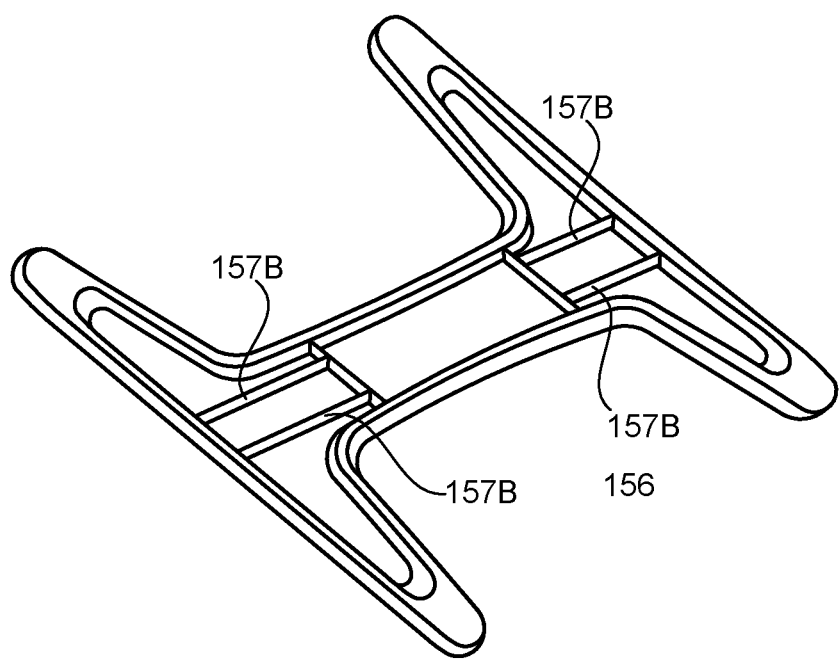
FIGS. 4B and 4C are perspective views of a frame of the main body of the example UAV shown in FIGS. 2A and 3, in accordance with implementations described herein.
Figure 4C:
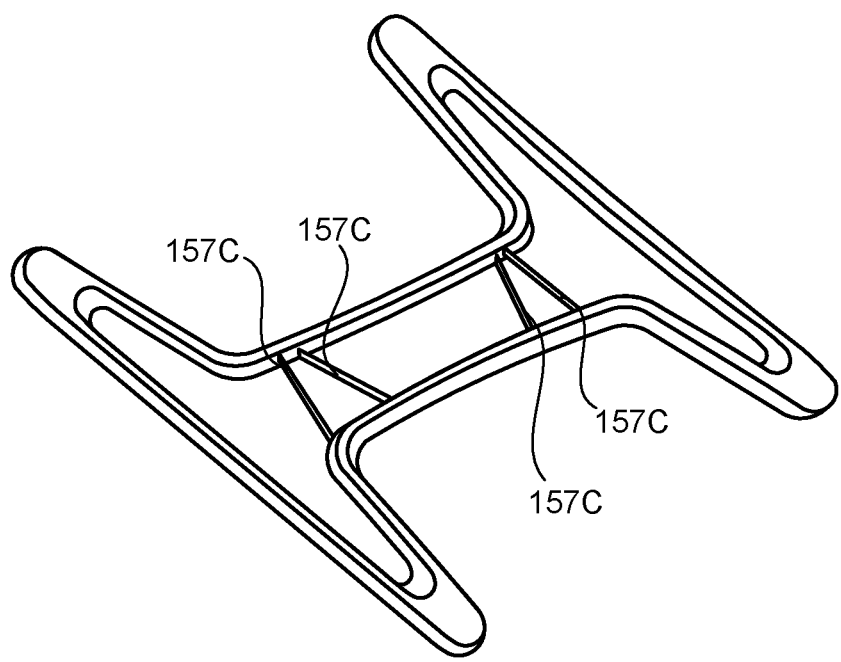

In some implementations, the frame 155 may include one or more reinforcing structures in the cavity 156 to provide additional structural rigidity while adding only minimal weight to the main body 150. In the example implementation shown in FIG. 4A, the example reinforcing structure includes reinforcing ribs 157A spanning across the central body 110 in a transverse direction. In the example shown in FIG. 4A, two reinforcing ribs 157A span across the central body 110 in the transverse direction. However, more, or fewer reinforcing ribs 157A may be included in the cavity 156. In some implementations, one or more reinforcing ribs 157B may extend in the longitudinal direction of the central body 110, as shown in FIG. 4B, either in addition to the transverse reinforcing ribs 157A, or instead of the transverse reinforcing ribs 157A. In some implementations, one or more reinforcing ribs 157C may be oriented at an angle, forming a truss type structure in which the reinforcing ribs 157C extend diagonally across the cavity 156, and/or diagonally from a bottom end portion of a first side of the cavity to a top end portion of a second (opposite) side of the cavity 156, as shown in FIG. 4C. Various numbers and combinations of the reinforcing ribs 157A/157B/157C may be included in the main body 150 to provide structural support and rigidity, depending on the requirements of a particular implementation, loading, mission and the like.

The reinforcing ribs 157A/157B/157C may be made of the same material as frame 155, or of a different, more rigid material than the frame 155, depending on a number of reinforcing ribs, the orientation/arrangement of the reinforcing ribs, the amount of additional structural rigidity and integrity to be provided by the reinforcing ribs, an amount of weight allotted for the reinforcing ribs in a particular implementation, and other such factors. Various different sizes and orientations of reinforcing ribs 157A/157B/157C may be arranged in the cavity 156 defined in the main body 150, depending on a particular shape, size and weight of the main body 150, components carried in and on the main body 150, and other such factors. The reinforcing ribs 157A/157B/157C are just one example of a reinforcing structure which may be included in the main body 150 to increase structural rigidity of the main body 150 while still allowing for a certain amount of flexibility in the main body 150 so that the main body 150 is able to absorb fluctuations in airflow, weight distribution, and the like during flight of the quadcopter 100.

In the views shown in FIGS. 4A-4C, reinforcing ribs 157A-157B/157C are included in the central body 110. In some implementations, reinforcing ribs may be included in the first arm 120 and/or in the second arm 130, in addition to, or instead of, in the central body 110.

In some implementations, certain portions of the main body 150 may be solid, or may have a corresponding portion of the hollow interior cavity 156 filled with a foam material, such as, for example, the same foam material as the frame 155 and/or the same foam material as the cover plate 158 and/or a different foam material from the frame 155 and the cover plate 158. For example, in some implementations, one or more of the end portions of the first arm 120 and/or one or more of the end portions of the second arm 130 may be solid or filled with material, as shown in FIGS. 4A-4C. This additional material at the respective end portions of the first and second arms 120 and 130 may provide additional structure for coupling and support of the rotors 125A-125D and the motors and mounting hub structures associated with the rotors 125A-125D. In some implementations, filler material, such as, for example, foam, may be included to, for example, surround certain components received in the cavity 156 defined in the main body 150, such as, for example, a controller, a battery, and audio/video input device and the like. By filling the cavity 156 only in areas requiring additional structural integrity and/or rigidity, or only making the areas of the main body 150 requiring additional structural integrity and/or rigidity solid while the remainder is hollow, weight of the main body 150 of the quadcopter 100 may be reduced while still maintaining the necessary degree of structural iuntegrity.

In some implementations, the cover plate 158 may include an access port 159 (also can be referred to as an access opening) defined by an opening extending through a predetermined portion of the cover plate 158. In the example implementation shown in FIG. 4A, the access port 159 is shown at the forward end portion 150F of the main body 150. However, the access port 159 may be positioned at numerous other locations on the cover plate 158, depending on the installation of various components received in the cavity 156 of the main body 150 to be accessed through the access port 159. A port cover 161 may be selectively coupled to the access port 159 to close the access port 159 when access to the cavity 156 is not required. The port cover 161 may be coupled in the access port 159 in various different ways. For example, in some implementations, a hinge may rotatably couple the port cover 161 to a portion of the cover plate 158 adjacent to a periphery of the access port 159. In some implementations, the port cover 161 may be, for example, press fit, snap fit, clipped in, or hingedly coupled to the access port 159, or adhered in the access port 159 by an adhesive. In some implementations, when the port cover 161 is fitted in the access port 159, a top surface 159A of the port cover 161 may be substantially co-planar with a top surface 158A of the cover plate 158.

In some implementations, the cavity 156 may be accessed through the access port 159 to, for example, remove and/or replace a component such as, for example, a battery for charging. In some implementations, a charging port may be included in, for example, a portion of the frame 155 or a portion of the cover plate 158, so that a battery received in the cavity 156 may be charged without removing and/or directly accessing the battery through the open top portion of the frame 155.

In some implementations, the cover plate 158 may be solid, or continuous, without an opening formed in the cover plate 158 to define the access port described above.

Figure 5A:
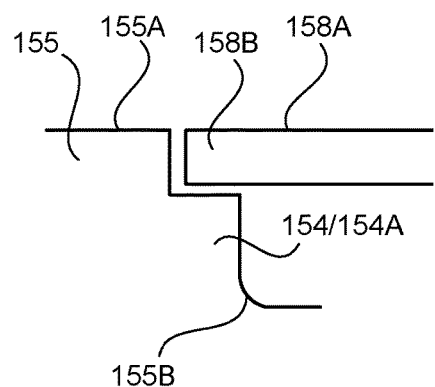
FIGS. 5A and 5B are side sectional views of a cover plate and a frame of the main body of the example UAV shown in FIGS. 2A-4C, in accordance with implementations described herein.
Figure 5B:
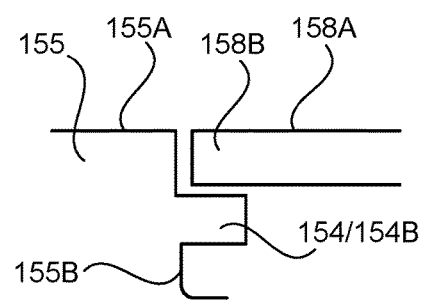
Figure 5C:
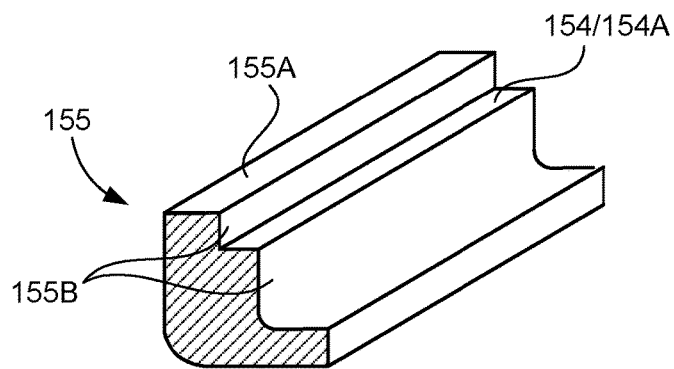
FIGS. 5C and 5D are perspective cutaway views of an inner wall of frame of the main body of the example UAV shown in FIGS. 2A-4C, in accordance with implementations described herein.
Figure 5D:
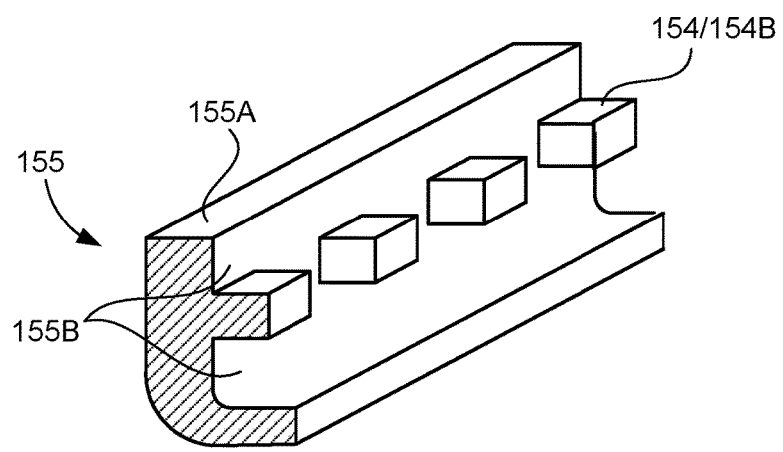

In some implementations, the cover plate 158 may be removably coupled to the frame 155. As illustrated in the side sectional view of the frame 155 and cover plate 158 shown in FIGS. 5A and 5B, in some implementations, when the cover plate 158 is coupled to the frame 155, the top surface 158A of the cover plate 158 may be substantially co-planar with a top surface 155A of the frame 155 defining an upper peripheral edge portion of the frame 155. The cover plate 158 may be positioned in the open top portion of the frame 155 to enclose the cavity 156. In some implementations, when positioned in the open top portion of the frame 155, a peripheral edge portion 158B of the cover plate 158 may be seated on a protrusion 154 on an inner peripheral wall 155B of the frame 155. In some implementations, the protrusion 154 may define a ledge 154A that extends substantially continuously along the inner peripheral wall 155B of the frame 155, as illustrated in the cutaway perspective view of the inner wall 155B of the frame 155 shown in FIG. 5C, or continuously along portions of the inner peripheral wall 155B of the frame 155. In some implementations, the protrusion 154 may define a series of separate protrusions 154B intermittently positioned (in a regular or irregular fashion in some implementations) along the inner peripheral wall 155B of the frame 155, as illustrated in the cutaway perspective view of the inner wall 155B of the frame 155 shown in FIG. 5D.

In some implementations, the cover plate 158 may be press fit, or snap fit, in the open top portion of the frame 155 so as to enclose the cavity 156 defined in the main body 150. In some implementations, an adhesive may fix the cover plate 158 in place in the open top portion of the frame 155 to enclose the cavity 156 defined in the main body. In some implementations, one or more clamps or clips, hinges, adhesives, and/or so forth, may hold the cover plate 158 in place in the open top portion of the frame 155.

In the example implementations shown in FIGS. 5A-5D, the cover plate 158 is seated in the open top portion of the frame 155, with a top peripheral portion of the frame 155 surrounding an outer peripheral portion of the cover plate 158. However, in some implementations, the cover plate 158 may be positioned on, or seated on, the top surface of the frame 155, so that the top surface of the frame 155 is substantially completely covered by the cover plate 158.

In some implementations, the cover plate 158 may be permanently coupled to the frame 155. In this instance, once the cover plate 158 is affixed to the frame 155, by for example, an adhesive, components received in the cavity 156 of the main body 150 may only be accessible via, for example, the access port 159 in the cover plate 158, or other interface points which may be included in the frame 155 and/or the cover plate 159. In some implementations, the cover plate may be another, relatively thin, relatively rigid material, such as, for example, a thin plastic or metal plate which may be fixed in place as described above. In some implementations, the cover plate 158 may be a plastic adhesive film, or other such material having an adhesive quality such that the cover plate 158 may be easily affixed in place on the frame 155.

As noted above, the H shaped main body 150 shown in FIGS. 2A-3 is just one example configuration of the main body, number of rotor(s) and arrangement of rotor(s). Another example implementation of an aerial platform is shown in FIGS. 6A-6E, making use of similar construction characteristics and functional principles, but implementing a different configuration main body, and a single, centrally positioned rotor.

Figure 6A:
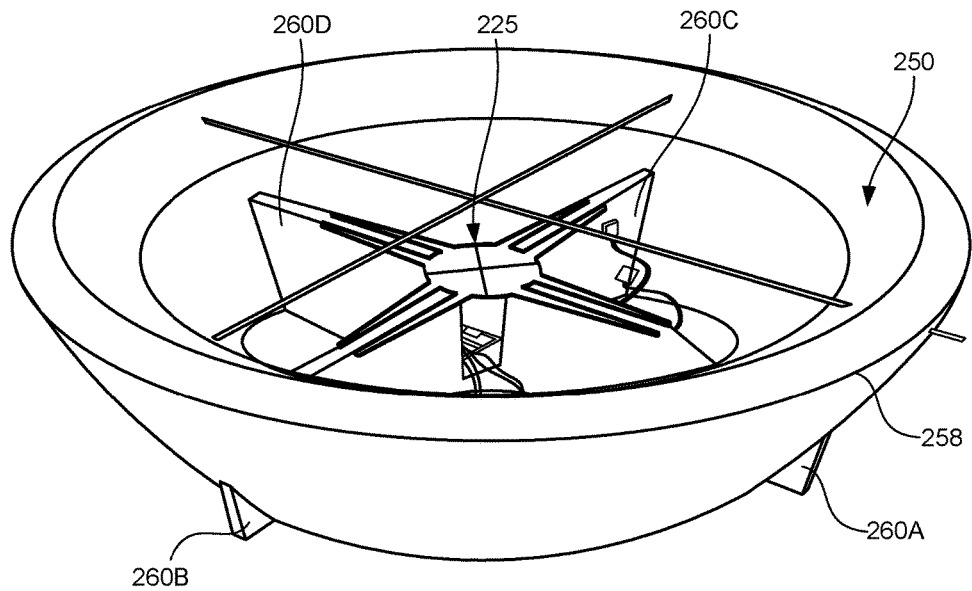
FIGS. 6A-6E illustrate various views of an aerial vehicle, in accordance with implementations described herein.
Figure 6B:
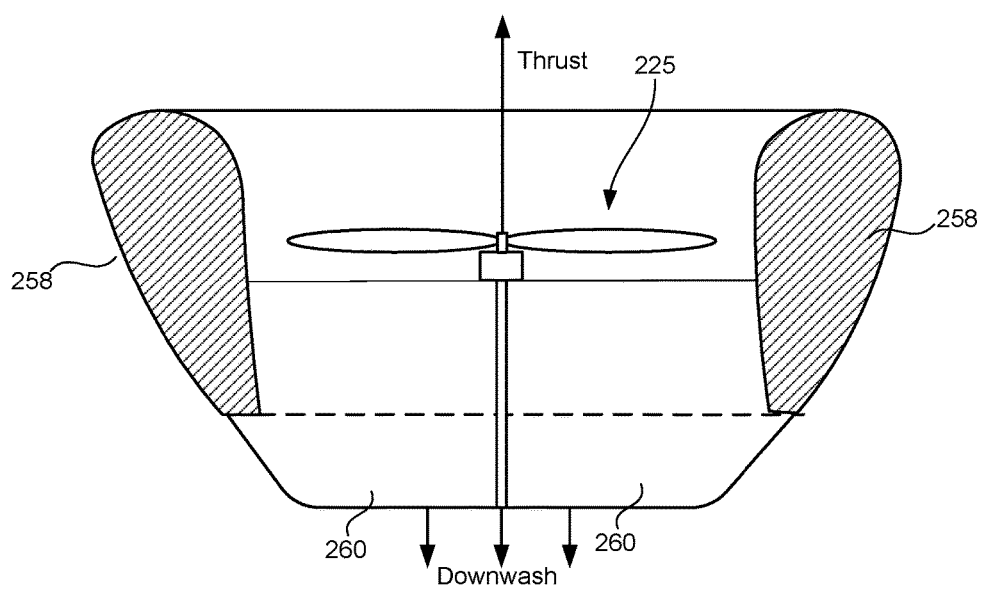

FIG. 6A is a top perspective view, and FIG. 6B is a cross sectional view, of an aerial vehicle 200, in accordance with implementations described herein. As shown in FIGS. 6A and 6B, the aerial vehicle may have a closed curve shape. For example, a frame 258 of the aerial vehicle 200 may define a substantially circular main body 250. A plurality of vanes 260, for example, four vanes 260A, 260B, 260C and 260D, may extend radially outward, from proximal end portions of the plurality of vanes 260 positioned an open central portion of the circular main body 250, to distal end portions of the plurality of vanes coupled to the frame 258. A rotor 225 may be supported on a mounting structure defined by the plurality of vanes 260A, 260B, 260C and 260D (particularly, at proximal end portions of the plurality of vanes 260), to propel the aerial vehicle 200 as described above in more detail. As shown in FIG. 6B, the centrally mounted rotor 225 may generate thrust to propel the aerial vehicle 200, while the downwash generated by operation of the rotor 225 may be directed downward, with the vanes 260 directing the downwash and providing for stability of the aerial vehicle 200.

Figure 6C:
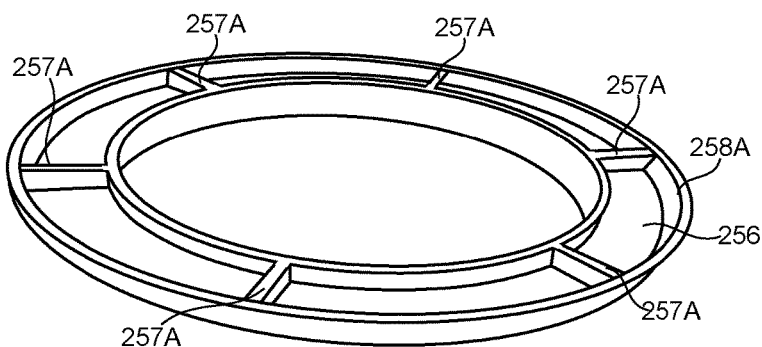
Figure 6D:
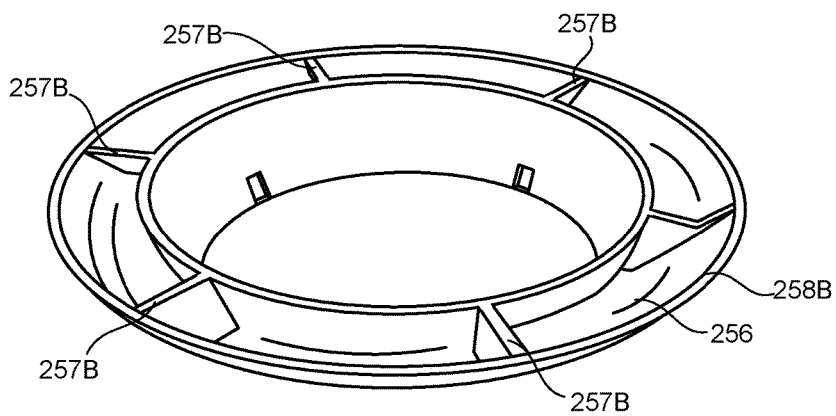
Figure 6E:
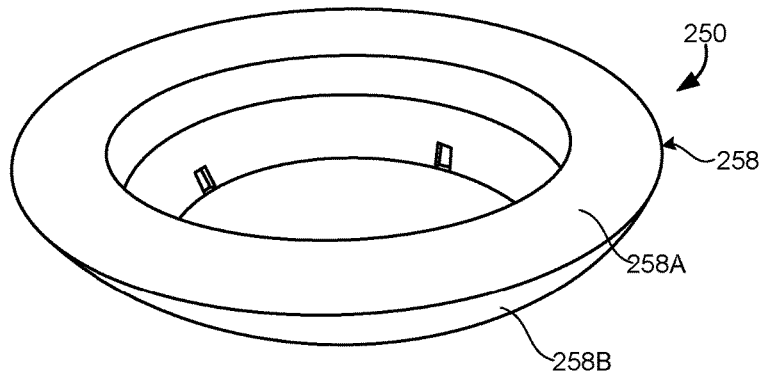

In some implementations, the frame 258 may include a top frame 258A attached to a bottom frame 258B to define a hollow interior cavity 256 within the main body 250. A bottom perspective view of the top frame 258A is shown in FIG. 6C, and a top perspective view of the bottom frame 258B is shown in FIG. 6D. An assembled perspective view, with a lower surface of the top frame 258A secured to an upper surface of the bottom frame 258B, is shown in FIG. 6E. The top frame 258A may be coupled to the bottom frame 258B in numerous different ways, such as, for example, described above with respect to FIGS. 5A-5D. As described above with respect to FIGS. 2A-4C, the hollow interior cavity 256 may house various components, and the material eliminated from the frame 258 to yield the hollow interior cavity 256 may reduce weight of the main body 250, and thus may reduce overall weight of the aerial vehicle 200.

As also described above with respect to FIGS. 2A-4C, in some implementations, the upper and lower frames 258A and 258B may be made of the same material, or may be made of different materials, depending on rigidity and structural integrity requirements of a particular implementation. For example, in some implementations, the frame 258 may be made of foam material(s) to reduce weight of the main body 250 as much as possible while still maintaining a sufficient degree of structural integrity and rigidity. In some implementations, the density of a first foam material of the upper frame 258A may be less than a density of a second foam material of the lower frame 258B. In some implementations, one, or both, of the upper frame 258A and/or the lower frame 258B may be made of a plastic or polymer material to provide additional rigidity.

In some implementations, the reinforcing ribs 257A and 257B may be made of the same material as that of the upper frame 258A and/or the lower frame 258B, or may be made of different materials, depending on the structural integrity and rigidity requirements associated with a particular implementation. In some implementations, more, or fewer, reinforcing ribs 257A and 257B may be arranged in the upper frame 258A and/or the lower frame 258B, and may extend in different directions, depending on the structural integrity and rigidity requirements associated with a particular implementation. The reinforcing ribs 257A and 257B are just one example of a reinforcing structure which may be included in the main body 250 to increase structural rigidity while still allowing for a certain amount of flexibility in the main body 250 so that the main body 250 to absorb fluctuations in airflow, weight distribution, and the like during operation of the aerial vehicle 200.

Referring back to FIG. 3, in the example implementation shown in FIG. 3, the image output device 140 is positioned at an aft end portion 150A of the quadcopter 100, at a portion of the main body 150 where the central body 110 joins the second arm 130, with the screen 160 provided at a forward end portion 150F of the main body 150, at a portion of the main body 150 where the central body 110 joins the first arm 120. For example, the screen 160 may be coupled to the first arm 120, opposite the image output device 140, so that there is an unobstructed line of sight between the image output device 140 and the screen 160.

The image output device 140 may process, for example, still and/or moving images. These images may be generated by a remote user, for display/projection in a space in which the quadcopter 100 is currently located. In some implementations, the current location of the quadcopter 100 may be different from the current location of the remote user. Images processed by the image output device 140 may be projected onto or displayed on the screen 160 coupled to the forward end portion of the quadcopter 100, for example, at the first arm 120, as shown in FIG. 3. In an implementation in which the quadcopter 100 includes the image output device 140 but not the screen 160, images processed by the image output device 140 may be projected onto or displayed onto another display surface in the current location, such as for example, a wall surface.

The central body 110, first arm 120 and second arm 130 of the main body 150 of the quadcopter 100 forming an 'H' shape as described above may provide an amount of structural rigidity and integrity sufficient to support the relatively large screen 160 at the forward end portion 150F of the main body 150, balanced against the weight of the image output device 140, while still being able to maintain balanced stable flight. In some implementations, ballast may be included in the hollow interior cavity 156 of the main body 150, and/or ballast may be coupled to the main body 150, to distribute weight and balance the main body 150 for stable flight.

The screen 160 may be coupled to the quadcopter 150, for example, to the first arm 120 as in the example implementation shown in FIG. 3, by a coupling device 170 having, for example, a hinge type structure, so that the screen 160 may be allowed some amount of movement, or rotation, relative to the first arm 120. In some implementations, the coupling device 170 may include, for example, a first hinge 172 coupling a first end portion of the screen 160 to the first arm 120, and a second hinge 174 coupling a second end of the screen 160 to the first arm 120. In other implementations, more, or fewer individual hinges may be used to couple the screen to the body of the quadcopter 150, and position(s) of the individual hinge(s) may be varied based on a physical configuration of a particular implementation.

This rotation of the screen 160 relative to the main body 150 of the quadcopter 100 may allow the screen 160 to move relatively freely as the orientation of the quadcopter 100 changes during flight, so that the screen 160 does not inhibit or otherwise impede stable movement and control of the quadcopter 100 during flight. For example, in some implementations, the rotatable coupling of the screen 160 to the main body 150 may allow the screen 160 to rotate in an aft direction in coordination with a changing orientation of the main body 150, so as to reduce and/or minimize a drag effect on the quadcopter 100 attributable to the screen 160. This reduced drag effect on the quadcopter 100 attributable to the screen 160 may in turn reduce a structural load applied to the main body 150 by the screen 160, and/or an amount of structure otherwise required to support the screen on the main body 150, reducing weight in a quadcopter 100 equipped in this manner.

In some implementations, the coupling device 170 may also include a rotation limiting device that limits an amount of rotation of the screen 160 in the forward direction, so that the screen 160 does not rotate into an air flow path of the rotors 125A-125D and/or interfere with rotation of the rotors 125A-125B.

In some implementations, the screen 160 may be relatively rigid, so that the screen 160 remains relatively stable, with minimal flutter during flight of the quadcopter 100, so that the screen 160, and movement of the screen 160, does not adversely impact stable flight and control. The screen 160 may also be relatively light so that the weight of the screen 160 does not have an adverse affect on maneuverability and energy consumption of the quadcopter 100. In some implementations, the screen 160 may be made of, for example, a monolithic foam material in which a portion of the foam has been milled away to define a display area having a minimal thickness with a frame surrounding the display area to provide rigidity. In some implementations, the screen 160, and in particular the display area of the screen 160, may include openings or perforations, allowing air to pass through the screen 160 during flight, reducing the effect of drag attributable to the screen 160 while also reducing weight of the screen 160. Such openings or perforations may be sized and arranged so that they are relatively imperceptible when an image is projected onto the screen 160, and so that they do not have a perceptible effect on image quality. These qualities of the screen 160, particularly when taken together with the rotatable coupling of the screen 160 to the main body 150, may further reduce the structural load applied to the main body 150 by the screen 160, thus reducing main body structural requirements and associated weight.

The example implementation shown in FIG. 3 illustrates a rear projection arrangement, in which the image output device 140 projects still and/or moving images onto the screen 160, and in particular, toward an aft surface 160A of the screen 160. In this type of arrangement, the screen 160 may be translucent or semi-translucent so that the images projected by the image output device 140 toward the screen 160 may be visible from a front surface 160F of the screen 160, essentially through the screen 160. This is just one example of an arrangement of an image output device and screen on a quadcopter which may allow image(s) to be displayed, real time, on the screen. Other arrangements of the image output device and screen may also be implemented.

The numerous features described above may be implemented in a UAV, such as, for example, a quadcopter, to achieve reductions in weight while maintaining a level of structural integrity sufficient to support components received in and/or coupled to the quadcopter and to maintain stability and control of the quadcopter during flight. For example, as noted above, the main body 150 including cover plate 158 coupled to the frame 155 may define the hollow interior cavity 156, the hollow interior cavity 156 reducing weight of the main body 150, while the reinforcing ribs 157A/157B/157C may provide structural reinforcement of this hollow main body structure. The frame 155 and/or the cover plate 158 may be made of a light weight material, such as, for example, a foam material, with one of the frame 155 or the cover plate 158 being made of a more rigid material than the other, so as to further minimize weight of the main body 150 while providing for structural rigidity. The 'H' shaped configuration of the main body 150 defined by the first arm 120 positioned at the first end of the central body 110 and the second arm positioned at the second end of the central body 110 may provide structural support for various components received in the hollow interior cavity 156 of the main body 150 and/or components coupled to the main body 150 without additional weight due to additional structure and/or heavier, more dense materials. Fill material in only designated portions of the hollow interior cavity 156, or solid (rather than hollow) structure only in designated portions of the main body 150, may provide structural support in the designated areas without adding unnecessary weight in areas not in need of additional structural support.

Figure 7:
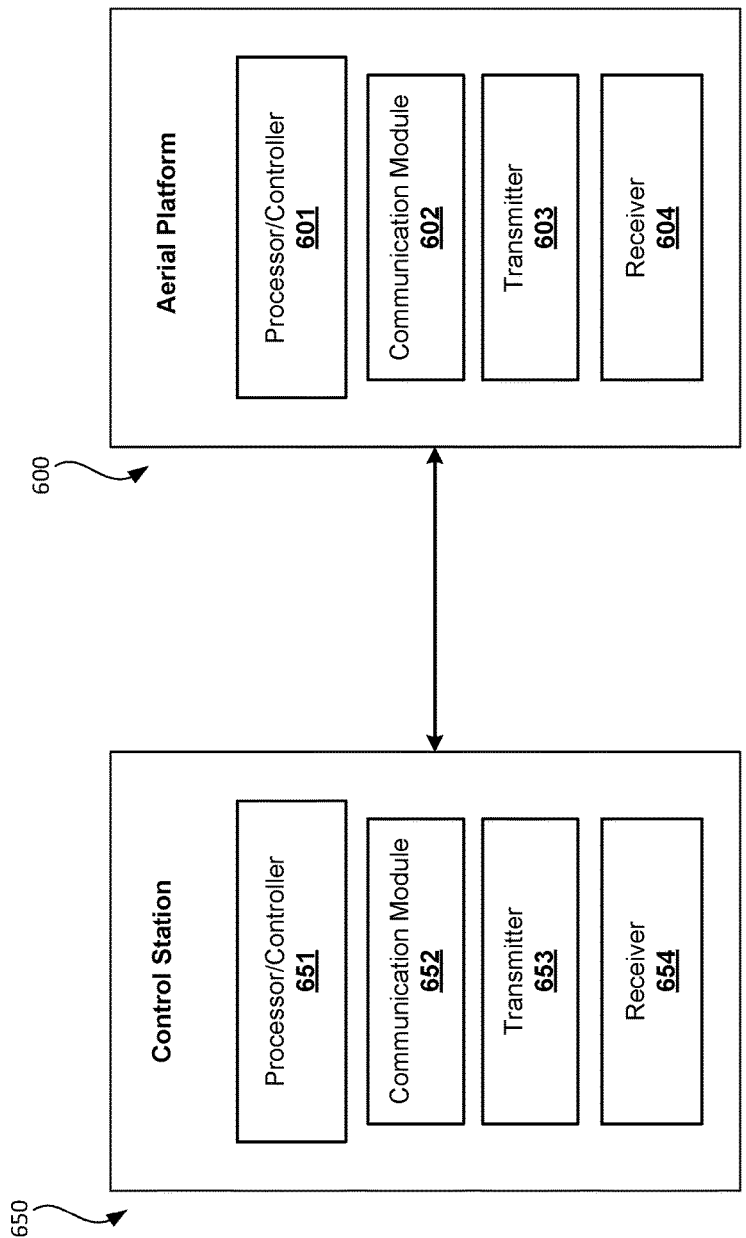
FIG. 7 illustrates an aerial platform in communication with a control station, in accordance with implementations described herein.

As noted above, an aerial platform such as the UAV described herein may be remotely piloted and/or controlled by, for example, a user manipulating a control station, or may fly autonomously based on a pre-programmed flight plan. As shown in FIG. 7, in some implementations, an aerial platform 600, such as, for example, the UAV described above with respect to FIGS. 2A through 6E, may communicate with a control station 650 allowing for remote piloting and control of the aerial platform 600 by a user, and/or for autonomous control based on a pre-programmed flight plan implemented by the control station 650. In some implementations, the control station 650 may be, for example, a portable electronic device such as a controller, a smartphone or other handheld device, a computing device such as a desktop, laptop, notebook or tablet computer, and other such electronic devices capable of communication with the aerial platform 600.

As shown in FIG. 7, the aerial platform 600 may include, for example, a controller including a processor 601, and a communication module 602 allowing the aerial platform 600 to communicate with the control station 650. The control station 650 may include, for example, a controller including processor 651, and a communication module 652 allowing the control station 650 to communicate with the aerial platform 600. A transmitter 653 of the control station 650 may transmit signals that are received by a receiver 604 of the aerial platform 600, and processed by the processor 601 of the aerial platform 600, for control navigation and control of the aerial platform 600 via the control station 650. Similarly, a transmitter 603 of the aerial platform 600 may transmit signals that are received by a receiver 654 of the control station 650, transmitting, for example, operational status, position, orientation and the like of the aerial platform 600 back to the control station 650. In this manner, the aerial platform 600 may be remotely piloted and/or controlled in response to user manipulation of the control station 650, or may fly autonomously based on a pre-programmed flight plan implemented by the control station 650.

Figure 8:
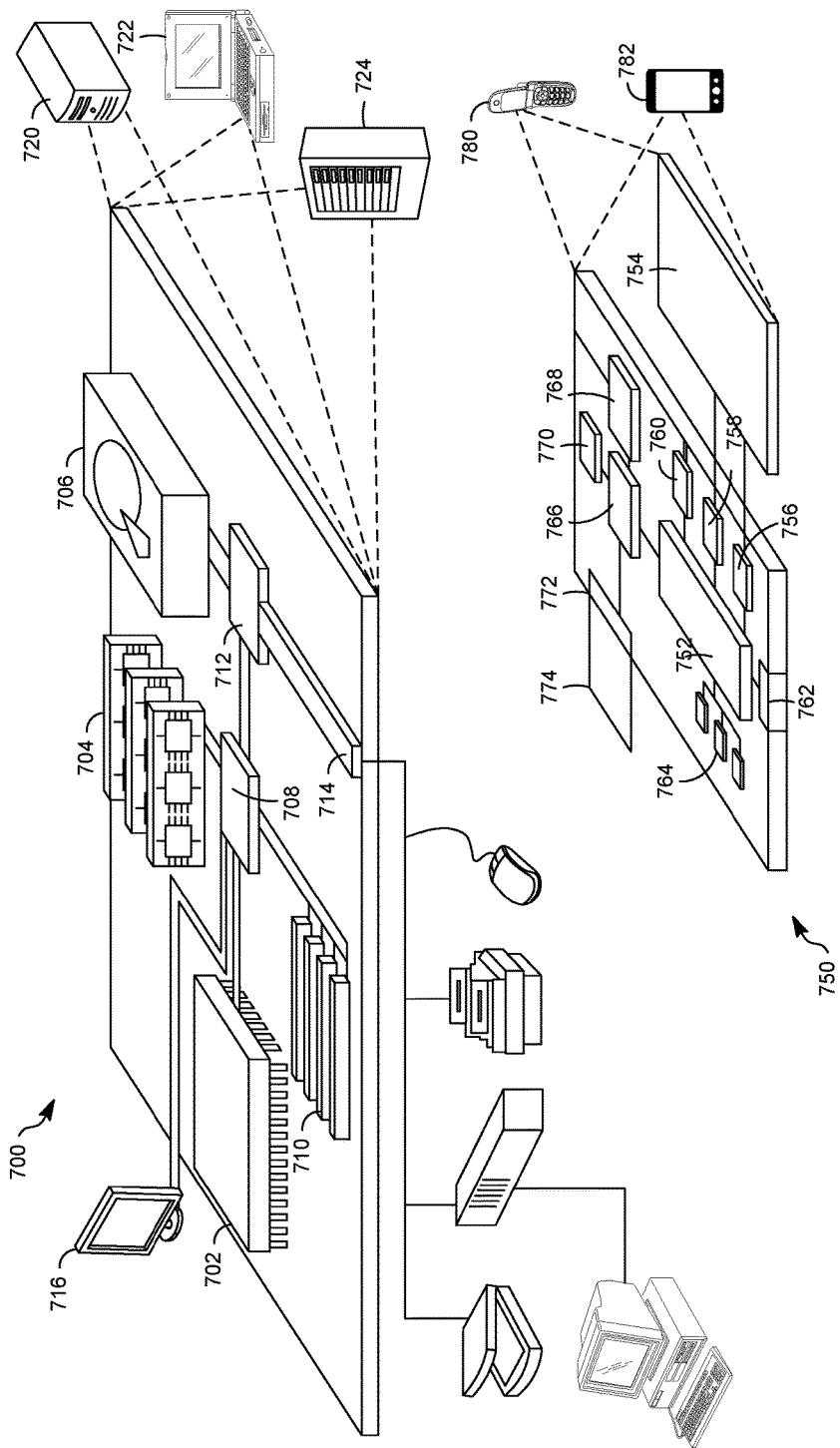
FIG. 8 illustrates an example of a computing device and a mobile computing device that can be used to implement the techniques described herein.

FIG. 8 shows an example of a generic computing device 700 and a generic mobile computing device 780, which may operate aerial platforms in accordance with implementations described herein. Computing device 700 is intended to represent various forms of digital computers, such as laptop computers, convertible computers, tablet computers, desktop computers, workstations, personal digital assistants, servers, blade servers, mainframes, and other appropriate computers. Computing device 780 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 800, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 780. Each of such devices may contain one or more of computing device 700, 780, and an entire system may be made up of multiple computing devices 700, 780 communicating with each other.

Computing device 780 includes a processor 782, memory 764, and an input/output device such as a display 784, a communication interface 766, and a transceiver 768, among other components. The device 780 may also be provided with a storage device, such as a microdrive or other device, to provide additional storage. Each of the components 780, 782, 764, 784, 766, and 768, are interconnected using various buses, and several of the components may be mounted on a common motherboard or in other manners as appropriate.

The processor 782 can execute instructions within the computing device 780, including instructions stored in the memory 764. The processor may be implemented as a chipset of chips that include separate and multiple analog and digital processors. The processor may provide, for example, for coordination of the other components of the device 780, such as control of user interfaces, applications run by device 780, and wireless communication by device 780.

Processor 782 may communicate with a user through control interface 788 and display interface 786 coupled to a display 784. The display 784 may be, for example, a TFT LCD (Thin-Film-Transistor Liquid Crystal Display) or an OLED (Organic Light Emitting Diode) display, or other appropriate display technology. The display interface 786 may comprise appropriate circuitry for driving the display 784 to present graphical and other information to a user. The control interface 788 may receive commands from a user and convert them for submission to the processor 782. For example, the control interface 788 may receive in input entered by a user via, for example, the keyboard 780, and transmit the input to the processor 782 for processing, such as, for entry of corresponding text into a displayed text box. In addition, an external interface 762 may be provide in communication with processor 782, so as to enable near area communication of device 780 with other devices. External interface 762 may provide, for example, for wired communication in some implementations, or for wireless communication in other implementations, and multiple interfaces may also be used.

The memory 764 stores information within the computing device 780. The memory 764 can be implemented as one or more of a computer-readable medium or media, a volatile memory unit or units, or a non-volatile memory unit or units. Expansion memory 774 may also be provided and connected to device 880 through expansion interface 772, which may include, for example, a SIMM (Single In Line Memory Module) card interface. Such expansion memory 774 may provide extra storage space for device 780, or may also store applications or other information for device 780. Specifically, expansion memory 774 may include instructions to carry out or supplement the processes described above, and may include secure information also. Thus, for example, expansion memory 774 may be provide as a security module for device 880, and may be programmed with instructions that permit secure use of device 880. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 874, or memory on processor 782, that may be received, for example, over transceiver 768 or external interface 762.

Device 780 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 780, which may be used as appropriate by applications running on device 780.

Device 780 may also communicate audibly using audio codec 760, which may receive spoken information from a user and convert it to usable digital information. Audio codec 760 may likewise generate audible sound for a user, such as through a speaker, e.g., in a handset of device 780. Such sound may include sound from voice telephone calls, may include recorded sound (e.g., voice messages, music files, etc.) and may also include sound generated by applications operating on device 780.

The computing device 780 may be implemented in a number of different forms, as shown in the figure. For example, it may be implemented as a cellular telephone 780. It may also be implemented as part of a smart phone 782, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An aerial vehicle, comprising:
   a main body, including:
      a frame, including:
         a central body defining a longitudinal axis of the frame;
         a first arm at a first end portion of the central body; and
         a second arm at a second end portion of the central body; and
      a cover plate coupled to the frame such that the frame and cover plate define an interior cavity in at least a portion of the main body;
   a propulsion system operably coupled to the main body; and
   a controller configured to control the propulsion system to propel the main body in response to an external command,
   wherein the frame is made of a first material and the cover plate is made of a second material, the second material being more rigid than the first material.

2. The aerial vehicle of claim 1, further comprising a reinforcing structure in the interior cavity in the main body.

3. The aerial vehicle of claim 2, wherein the reinforcing structure includes a plurality of reinforcing ribs each extending in a transverse direction across a respective portion of the interior cavity, between opposite interior walls of the main body.

4. The aerial vehicle of claim 2, wherein the reinforcing structure includes a plurality of reinforcing ribs arranged in the interior cavity of the main body, each of the plurality of reinforcing ribs extending in different directions between opposite interior walls of the main body.

5. The aerial vehicle of claim 1, wherein the frame is made of a foam material having a first density and the cover plate is made of a foam material or a plastic material having a second density that is greater than the first density.

6. The aerial vehicle of claim 5, further comprising a plurality of reinforcing ribs arranged in the interior cavity of the main body, the plurality of reinforcing ribs being made of a material having a third density that is greater than the first density.

7. The aerial vehicle of claim 1, wherein the frame is made of a foam material and the cover plate is made of a plastic material.

8. The aerial vehicle of claim 1, wherein the cover plate is press fit or snap fit into the open top end portion of the frame.

9. The aerial vehicle of claim 1, wherein the propulsion system includes:
   a first rotor at a first end portion of the first arm;
   a second rotor at a second end portion of the first arm;
   a third rotor art a first end portion of the second arm; and
   a fourth rotor at a second end portion of the second arm.

10. An aerial vehicle comprising:
    a main body, including:
       a frame, including:
          a central body defining a longitudinal axis of the frame;
          a first arm at a first end portion of the central body; and
          a second arm at a second end portion of the central body; and
       a cover plate coupled to the frame such that the frame and cover plate define an interior cavity in at least a portion of the main body;
    a first rotor at a first end portion of the first arm;
    a second rotor at a second end portion of the first arm;
    a third rotor art a first end portion of the second arm;
    a fourth rotor at a second end portion of the second arm;
    filler material in portions of the interior cavity corresponding to the first and second end portions of the first arm, and the first and second end portions of the second arm;
    a propulsion system operably coupled to the main body; and a controller configured to control the propulsion system to propel the main body in response to an external command, wherein the frame is made of a first material and the cover plate is made of a second material, the second material being more rigid than the first material.

11. The aerial vehicle of claim 1, wherein the controller includes a communication module configured to receive the external command from an external control station remote from the aerial vehicle, and a processor configured to process the received external command to control operation of the propulsion system, such that the aerial vehicle is remotely navigated in response to external commands received from the external control station.

12. The aerial vehicle of claim 1, further comprising:
a screen arranged at or near the first end portion of the central body; and
an image output device arranged at or near the second end portion of the central body, wherein the image output device is operable to project an image towards the screen.

13. The aerial vehicle of claim 12, wherein the screen and the image output device are positioned such that a weight of the image output device is balanced against at least a portion of the weight of the screen.

* * * * *